June 4, 1968 J. D. MILLER 3,386,755
QUICK-DISCONNECT PIPE COUPLING
Filed June 30, 1967 2 Sheets-Sheet 1

INVENTOR.
JOHN D. MILLER
BY
Wells & St. John
ATTYS.

United States Patent Office 3,386,755
Patented June 4, 1968

3,386,755
QUICK-DISCONNECT PIPE COUPLING
John D. Miller, Spokane, Wash., assignor to Anderson-Miller Manufacturing Company, Spokane, Wash., a corporation of Washington
Filed June 30, 1967, Ser. No. 650,285
4 Claims. (Cl. 285—6)

ABSTRACT OF THE DISCLOSURE

The disclosure describes a quick-disconnect pipe coupling for irrigation pipelines. The coupling has a female element 11 with a cradle that extends forward for guiding the male element 12 into the female element. The cradle has hook-shaped side walls that have longitudinal slots 40 formed therein that face the opening of the female element. The slots 40 receive lugs that are formed on the exterior of the male element 12 for preventing the disconnection of the coupling without first moving the elements together. A spring 53 is mounted between the elements to maintain the lugs in the slots 40.

Background of the invention

This invention is concerned with quick-disconnect couplings for irrigation pipelines and in particular for connecting side-tube irrigation pipelines to the main pipeline in an irrigation system.

To obtain the maximum coverage during each setting of an irrigation pipeline system, it is often found advantageous to attach side-tube pipelines to the main pipeline at spaced intervals and string the side pipelines outwardly from the side of the main pipeline. Between each setting, wheel supported main pipelines are moved transversely across the field dragging the side-tube lines along thereafter. Considerable bending, torsional and tensional forces are exerted on the couplings connecting the side-tube lines with the main pipeline.

After a field is irrigated, the irrigation pipeline system is moved to another field. This is generally accomplished by disconnecting the individual side-tube lines from the main pipeline; moving the main pipeline and the side-tube lines separately to the new field. Thereupon the side-tube lines are reconnected to the main pipeline.

One of the principal objects of this invention is to provide a quick-disconnect pipe coupling that can withstand substantial bending, torsional and tensional forces without leaking or disconnecting.

An additional object of this invention is to provide a quick-disconnect coupling that is a substantial improvement over the coupling described in the copending patent application, Ser. No. 503,928, filed Oct. 23, 1965.

A further object of this invention is to maintain the coupler element under axial tension to prevent inadvertent disconnection of the coupler and to permit a certain degree of axial movement of the coupler elements without disconnecting the coupling.

An additional object of this invention is to provide a quick-disconnect pipe coupling that is extremely efficient in operation, simple in construction, and economical to manufacture.

A further object of this invention is to provide a quick-disconnect pipe coupling in which the coupler elements must be moved axially a prescribed distance against the tensional force before the elements can be disconnected.

An additional object of this invention is to provide a pipe connection that is expandable in order to accommodate heat expansion and contraction.

These and other objects of this invention will become apparent upon reading the following description of a preferred embodiment of the invention.

Brief description of the drawings

A preferred embodiment of this invention is illustrated in the accompanying drawings in which.

Description of the preferred embodiment

Figure 1:
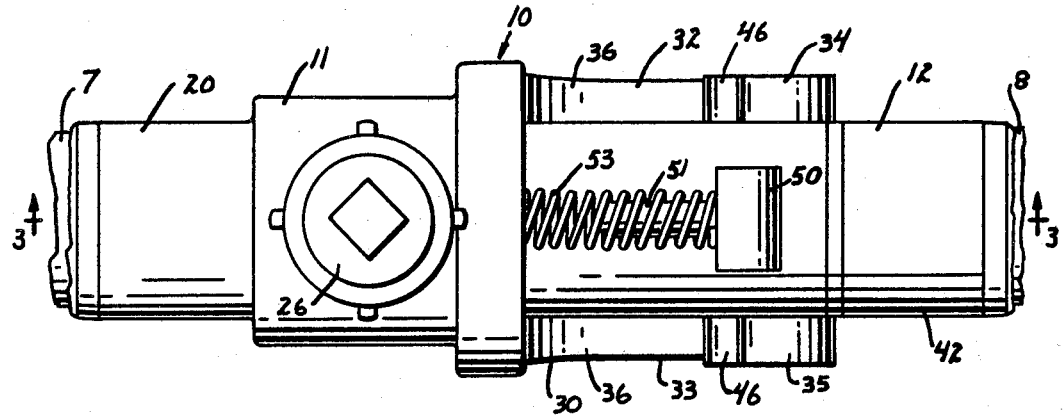
FIG. 1 is a plan view of a quick-disconnect pipe coupling incorporating the features of the invention.

Referring now in detail to the drawings there is shown in plan view in FIG. 1 a coupling 10 having two principal elements connected to the ends of the pipes 7 and 8 respectively. The coupling 10 is of the quick-disconnect variety for enabling one to quickly separate the pipes by manipulating the coupling in a prescribed manner.

The coupling 10 has two basic elements—a female coupler element 11 and a male coupler element 12. The female coupler 11 has an opening 14 (FIGS. 3 and 4) for receiving the male coupler 12.

The female coupler element 11 has a central bore 15 (FIG. 3) formed therein for receiving one end of the male coupler element 12. An annular groove 16 is formed in the inner wall of the female element 11 for receiving a resilient seal 17. The seal 17 is of a conventional type having a lip 18 that engages the outer surface of the male coupler element forming a seal therebetween to prevent leakage of water from the coupling. The female coupler element 11 has an end section 20 for receiving one end of the pipe 7. The end section 20 has an inner wall 23 with a diameter slightly less than the outer diameter of the pipe to form a swaged fit with the pipe end. A large size pipe may be swaged fit on the outside of the section 20.

The female element 11 also has a threaded radial aperture 25 formed therein communicating with the central bore 15 for receiving a plug or sprinkler riser 26. The female element has an enlarged shoulder or abutment 27 immediately above the opening 14 with the side surface facing the male coupler element 12.

The female coupler element has a cradle section 30 that extends outwardly from the opening 14 for guiding the male coupler into the opening 14. The cradle 30 has a concave inner surface that conforms with an outer surface of the male element 12. The cradle 30 has a shoe section 31 on the bottom thereof that engages the earth and provides a platform for enabling the coupler to move over the ground without becoming entangled with the vegetation.

The cradle 30 has curved side walls 32 and 33 (FIG. 1) that have concave inner surfaces complementary to the outer surface of the male element for restricting the movement of the male element. The side walls 32 and 33 have hook-shaped ends 34 and 35 respectively with slots 40 that face the opening 14.

Figure 2:
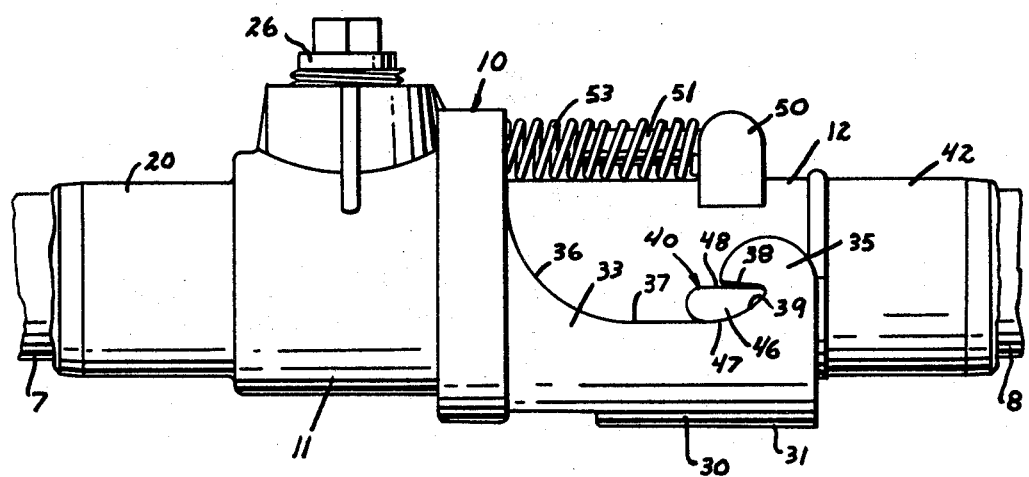
FIG. 2 is a side elevation view of the pipe coupling.
Figure 4:
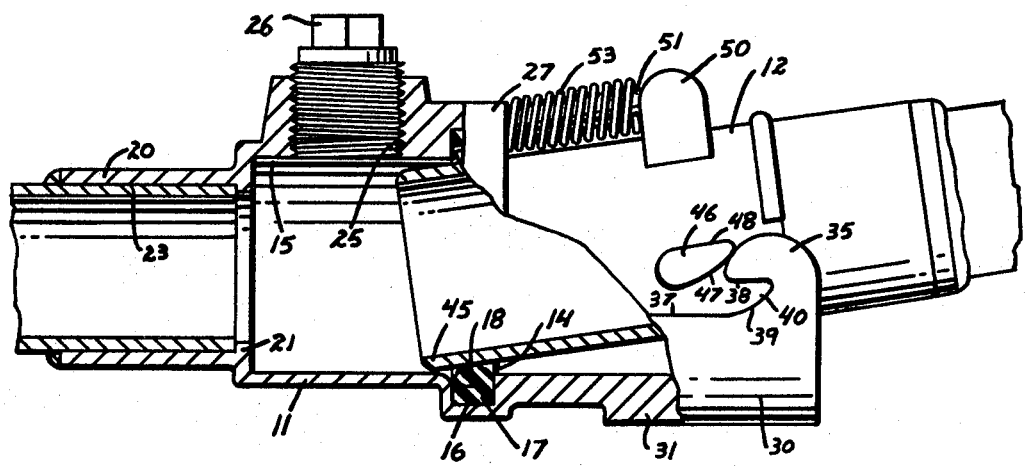
FIG. 4 is a cross sectional view similar to FIG. 3 except showing the coupling elements in the semi-disconnected position.

Each of the side walls 32 and 33 are the mirror image of each other and have contoured top edge surfaces 36. The contoured edge surface 36 includes a lower longitudinal flat segment 37 (FIGS. 2 and 4). Each slot 40 forms a substantially flat upper longitudinal wall surface 38 and a curved lower wall surface 39 that flows into the flat segment surface 37. The slot 40 is substantially aligned parallel with the axis of the coupling.

The tubular male element 12 has an end 42 for receiving the end of pipe 8. The internal diameter of the end 42 is slightly less than the outer diameter of the pipe 8 to form a swaged fit therewith. A larger sized pipe may be mounted on the outer surface of the end 42. The other end 45 of the male coupler element 12 extends into the opening 14 for sliding engagement with the lip 18 of the seal 17.

The central portion of the male coupler element 12 has two diametrically opposed lugs 46 extending radially from the exterior of the male element for fitting within the slots 40 of the female element 11. Each of the lugs 46 has a contoured lower surface 47 and a flat upper surface 48. The upper flat surface 48 moves into sliding engagement with the upper flat surface of the slot or recess surface 38. The lower surface 47 slides along the cradle surface 37 and the curved slot surface 39 to wedge the lug into the slot 40.

Angularly spaced between the lugs 46 is an abutment 50 that is angularly aligned with the abutment 27. A post 51 is mounted on the side of the abutment 50 and extends longitudinally toward the female coupler element 11 in angular alignment with the side surface 28.

A compression spring 53 is mounted over the post 51 between the abutment 50 and the abutment 27 for maintaining tensional force on the female and male elements.

Figure 3:
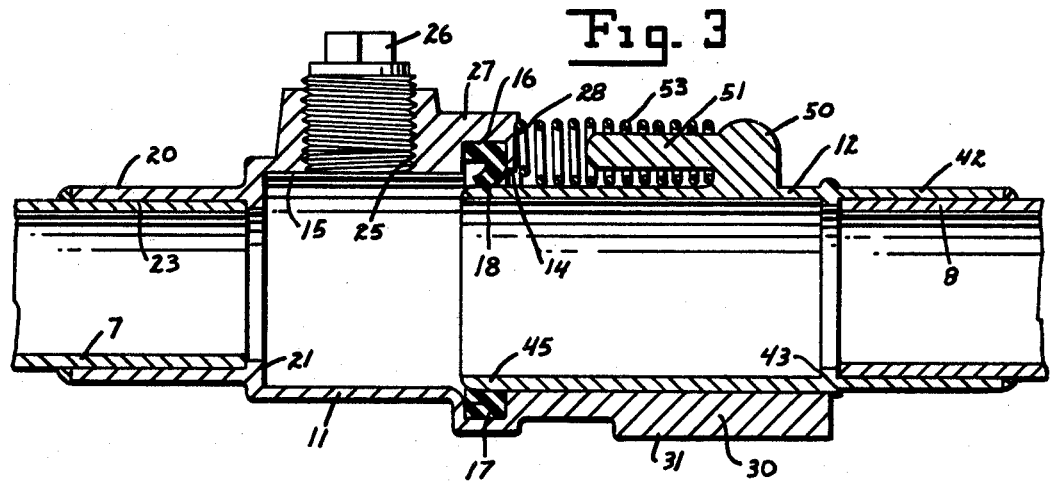
FIG. 3 is a cross sectional view taken on line 3—3 in FIG. 1 showing the coupling elements connected.

FIGURES 1 through 3 show the coupling in the assembled position in which the female and male elements are connected with the end 45 of the male element extending into the female element for providing communication between the coupler elements. The spring 53 biases the lugs 46 into the slots 40 so that the coupling will not become disconnected when tensional and torsional forces are applied to the elements. Often it is necessary to place tall sprinkler rises in the apertures 25 so that a tall crop may be properly irrigated. The tall sprinkler risers tend to tip over placing a substantial torque on the pipe. The lug-slot arrangement resists the tendency of the risers to fall over. Also the lug-slot arrangement permits some axial movement to occur caused by temperature changes.

To quickly disconnect the coupling 10 (FIG. 4) one applies a compressive force to the coupling 10 to move the male element 12 longitudinally towards the female element to move the lugs from the longitudinal slots 40. The flat surface 48 of the lugs 46 slides along the flat hook surface 38 as the male element is moved inwardly. The contoured surface 47 of the lugs 46 moves along the flat wall surfaces 37 and contoured slot surfaces 39. When the male element 12 is compressed against the spring 53 a predetermined distance the lugs 46 clear the slots 40. Then the male element 12 may be pivoted upwardly to swing the lugs 46 free from the hook-shaped cradle ends 34 and 35. At this point the male element 12 may be pulled away from the female element 11 so that the end 45 disengages with the seal 17 to disconnect the coupler elements. To connect the coupler elements 11 and 12 one follows the reverse procedure.

It should be appreciated that the specific features of the coupling 10 enables the elements to be quickly connected and disconnected when desired but prevents the inadvertent disconnection by the application of torsional, bending and tensional forces on the coupling. It should be also appreciated that the slots 40 are designed to permit some relative axial compressive movement of the male element without disconnecting the coupling.

It should be understood that the above described embodiment is simply illustrative of the principles of this invention. Numerous other slight modifications may be made to the specific structure as shown without deviating from the principles of this invention. Therefore only the claims are intended to define this invention.

What is claimed is:
1. An improved quick-disconnect pipe coupling for irrigation pipelines, comprising:
    (a) a tubular male coupler element affixed to the end of one irrigation pipeline, said male element having:
        (1) a terminal end;
        (2) two side lugs projecting outwardly in opposed relationship from the exterior of the male element, said lugs being disposed axially from said terminal end;
        (3) an abutment formed on the exterior of the male element intermediate said lugs;
    (b) a hollow female coupler element affixed to the end of the other pipeline and having a socket with an internal diameter greater than the external diameter of said male element for telescopically receiving the terminal end of the male element in slidable relation, said female element having:
        (1) an annular resilient seal mounted therein adjacent the opening slidably engaging the exterior of the male element axially of said terminal end;
        (2) a concave cradle extending outward of the socket for guiding the male element into the socket, said cradle having hooked-shaped side walls forming slots that face the socket for receiving the lugs therein to prevent the disconnection of the elements by the application of bending, tensional or torsional forces applied therebetween; and
        (3) an abutment formed on the exterior of the female section in angular alignment with the male element abutment; and
    (c) a compression spring mounted between the element abutments for biasing the elements longitudinally outward to maintain the lugs in the cradle slots to prevent the inadvertent disconnection of the coupler elements.
2. The coupler as defined in claim 1 wherein each of the hook-shaped cradle walls has a slot surface that is parallel with the coupler axis for slidably engaging a corresponding lug for preventing the removal of the male element from the female element without first moving the male element longitudinally with respect to the female element to compress the spring until the lugs clear said longitudinal slot surfaces.
3. The coupler as defined in claim 1 wherein the male element has a spring mounting for supporting the spring.
4. A coupler as defined in claim 3 wherein the spring mounting includes a post projecting toward the female element for receiving the spring thereabout.

References Cited

UNITED STATES PATENTS

| | | | |
|---|---|---|---|
| 744,073 | 11/1903 | Henderson | 285—283 |
| 1,022,927 | 4/1912 | Bradley | 285—283 |
| 1,070,885 | 8/1913 | Gentile et al. | 285—317 |
| 1,587,079 | 6/1926 | Machino | 285—374 |
| 2,448,547 | 9/1948 | Purdy | 285—317 |
| 2,736,384 | 2/1956 | Potts | 285—302 |
| 2,976,063 | 3/1961 | Kuhlman | 285—302 |

EDWARD C. ALLEN, *Primary Examiner.*

CARL W. TOMLIN, *Examiner.*

W. SHEDD, *Assistant Examiner.*